(12) United States Patent
Kim et al.

(10) Patent No.: US 12,206,062 B2
(45) Date of Patent: Jan. 21, 2025

(54) SECONDARY BATTERY AND METHOD FOR MANUFACTURING THE SAME

(71) Applicant: LG Chem, Ltd., Seoul (KR)

(72) Inventors: Do Gyun Kim, Daejeon (KR); Sang Suk Jung, Daejeon (KR); Byoung Kook Lee, Daejeon (KR); Hang Soo Shin, Daejeon (KR); Geon Woo Min, Daejeon (KR); Byoung Gu Lee, Daejeon (KR); Chan Bae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 15 days.

(21) Appl. No.: 17/544,393

(22) Filed: Dec. 7, 2021

(65) Prior Publication Data

US 2022/0093998 A1 Mar. 24, 2022

Related U.S. Application Data

(62) Division of application No. 16/463,952, filed as application No. PCT/KR2018/003407 on Mar. 23, 2018, now abandoned.

(30) Foreign Application Priority Data

Apr. 14, 2017 (KR) ........................ 10-2017-0048646

(51) Int. Cl.
*H01M 10/04* (2006.01)
*H01M 50/167* (2021.01)
(Continued)

(52) U.S. Cl.
CPC ..... *H01M 10/0422* (2013.01); *H01M 50/167* (2021.01); *H01M 50/171* (2021.01);
(Continued)

(58) Field of Classification Search
CPC ............. H01M 50/186; H01M 50/167; H01M 50/193; H01M 50/171; H01M 50/197; H01M 2220/30; H01M 10/0422
See application file for complete search history.

(56) References Cited

U.S. PATENT DOCUMENTS

2009/0104521 A1 4/2009 Yasuda et al.
2009/0123824 A1 5/2009 Fujiwara et al.
(Continued)

FOREIGN PATENT DOCUMENTS

CN 101449407 A 6/2009
CN 101894966 A 11/2010
(Continued)

OTHER PUBLICATIONS

English machine translation of JPS62126544 (Year: 1987).*
(Continued)

*Primary Examiner* — Kourtney R S Carlson
(74) *Attorney, Agent, or Firm* — Lerner David LLP

(57) ABSTRACT

The present invention relates to a secondary battery, in which a sealing property is improved, and a method for manufacturing the same.

The secondary battery includes: a can member having an opening; a top cap assembly sealing the opening; a gasket insulating the opening from the top cap assembly; and a hot melt applied to a surface of the gasket, wherein the hot melt has fluidity and viscosity at a predetermined temperature or more and is hardened at a temperature less than the predetermined temperature.

4 Claims, 4 Drawing Sheets

(51) Int. Cl.
H01M 50/171 (2021.01)
H01M 50/186 (2021.01)
H01M 50/193 (2021.01)
H01M 50/197 (2021.01)

(52) U.S. Cl.
CPC ....... H01M 50/186 (2021.01); H01M 50/193 (2021.01); H01M 50/197 (2021.01); *H01M 2220/30* (2013.01)

(56) References Cited

U.S. PATENT DOCUMENTS

| | | | |
|---|---|---|---|
| 2010/0022717 A1 | 1/2010 | Honma et al. | |
| 2010/0248014 A1 | 9/2010 | Huang et al. | |
| 2010/0291432 A1 | 11/2010 | Kim | |
| 2012/0028090 A1* | 2/2012 | Kyung-Su | H01M 50/169 |
| | | | 429/185 |
| 2014/0091296 A1* | 4/2014 | Yoo | H10K 50/841 |
| | | | 523/400 |
| 2015/0024258 A1 | 1/2015 | Sumiyama et al. | |
| 2016/0172638 A1 | 6/2016 | Amano et al. | |
| 2017/0018744 A1 | 1/2017 | Ogihara et al. | |
| 2017/0294635 A1* | 10/2017 | Kim | H01M 50/167 |
| 2018/0097215 A1* | 4/2018 | Cho | H01M 50/119 |
| 2018/0205047 A1* | 7/2018 | Ogihara | H01M 50/124 |

FOREIGN PATENT DOCUMENTS

| | | | | |
|---|---|---|---|---|
| CN | 102336883 A | 2/2012 | | |
| CN | 104364938 A | 2/2015 | | |
| CN | 105349078 A | 2/2016 | | |
| JP | S5554374 A | 4/1980 | | |
| JP | 62126544 A * | 6/1987 | ......... | H01M 2/0413 |
| JP | S62126545 A | 6/1987 | | |
| JP | H06260211 A | 9/1994 | | |
| JP | H09120806 A | 5/1997 | | |
| JP | H10289729 A | 10/1998 | | |
| JP | H1121516 A | 1/1999 | | |
| JP | 2003123709 A | 4/2003 | | |
| JP | 3621678 B2 | 2/2005 | | |
| JP | 2008097965 A | 4/2008 | | |
| JP | 6119759 B2 | 4/2017 | | |
| KR | 20100036316 A | 4/2010 | | |
| KR | 20140139357 A | 12/2014 | | |
| KR | 20170116370 A | 10/2017 | | |
| WO | 2008041451 A1 | 4/2008 | | |
| WO | WO-2017160972 A1 * | 9/2017 | ......... | H01M 4/8626 |

OTHER PUBLICATIONS

Jackson, W.J., Jr., Gray, T.F., Jr. and Caldwell, J.R. (1970), Polyester hot-melt adhesives. I. Factors affecting adhesion to epoxy resin coatings. J. Appl. Polym. Sci., 14: 685-698. (Year: 1970).*
Atkinson, C. "Chapter 3." False Twist Textured Yarns: Principles, Processes and Applications, Woodhead Pub., Cambridge, 2012, pp. 28-58. (Year: 2012).*
"Adhesive Bonding Manual," edited by Wengan XIA et al., National Defence Industry Press, Feb. 1989, 17 pages.
Search Report dated Jan. 4, 2022 from the Office Action for Chinese Application No. 201880005463.3 issued Jan. 13, 2022, 3 pages.
International Search Report for PCT/KR2018/003407 mailed Jul. 4, 2018.
Extended European Search Report including the Written Opinion for Application No. EP 18783648.1 dated Nov. 22, 2019, 7 pages.
Search Report for Chinese Office Action Application No. 201880005463.3 dated Jul. 9, 2021. 3 pgs.

* cited by examiner

SECONDARY BATTERY AND METHOD FOR MANUFACTURING THE SAME

CROSS-REFERENCE TO RELATED APPLICATION

The present application is a divisional of U.S. application Ser. No. 16/463,952, which is a national phase entry under 35 U.S.C. § 371 of International Patent Application No. PCT/KR2018/003407, filed on Mar. 23, 2018, published in Korean, which claims priority from Korean Patent Application No. 2017-0048646, filed on Apr. 14, 2017, the disclosures of which are hereby incorporated herein by reference in their entireties.

TECHNICAL FIELD

The present invention relates to a secondary battery and a method for manufacturing the same, and more particularly, to a secondary battery, in which a sealing property is improved, and a method for manufacturing the same.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

A non-permeable sealing member for non-aqueous electrochemical cells according to the related art is disclosed in Korean Patent Publication No. 10-2010-0036316.

In the secondary battery according to the related art, sealing of a gasket part is achieved by pressing and sealing a gasket together with an upper end of a can member through a physical force. As a result, there is a problem that leakage occurs due to dimensions of parts or an assembly process deviation, or performance is deteriorated due to moisture penetration.

DISCLOSURE OF THE INVENTION

Technical Problem

Therefore, the present invention has been made to solve the abovementioned problem, and an object of the prevent invention is to provide a secondary battery, in which a sealing property is improved, and a method for manufacturing the same.

Technical Solution

A secondary battery according to an embodiment of the present invention includes: a can member having an opening; a top cap assembly disposed within the opening; a gasket insulating the opening from the top cap assembly and providing a seal between the can member and the top cap assembly; and a hot melt applied to a surface of the gasket assembly and configured to adhere the gasket to at least one of: the can member or the top cap assembly, wherein the hot melt has fluidity and viscosity at a first temperature equal to or greater than a predetermined temperature and is in a hardened state at a second temperature less than the predetermined temperature.

The predetermined temperature may be a glass transition temperature (Tg) of a material of the hot melt.

The predetermined temperature may be 60° C.

The hot melt may have an adhesive property at the first temperature.

The hot melt may include a material that is configured to repeatedly transition between a viscous state and the hardened state, the material being in the viscous state at the first temperature and being in the hardened state at the second temperature.

The hot melt may include a thermoplastic resin and a tackifier.

The hot melt may further include a coupling agent.

The thermoplastic resin may include a polyester-based resin.

The tackifier may include at least one or more of a phenol-based resin, a carbon-based resin, and a rosin-based resin.

The coupling agent may include one or more of aminosilane and vinylsilane, which are silicon-based materials.

A method for manufacturing a secondary battery according to an embodiment of the present invention includes: a preparation step of preparing a can member, a top cap assembly, and a gasket; a coating step of applying a hot melt that is dissolved in an organic solvent to a surface of the gasket; a drying step of drying the gasket to evaporate the organic solvent after the coating step; an assembly step of assembling the cap member and the top cap assembly with the gasket after the drying step to manufacture a secondary battery; and an activation step of activating the secondary battery, wherein the activation step includes changing a phase of the hot melt by changing a temperature of the secondary battery, such that the gasket is airtightly adhered to the can member and the top cap assembly by the hot melt that is changed in phase.

The activation step may include: a room-temperature aging process of aging the secondary battery at a room temperature; a high-temperature aging process of aging the secondary battery at a first temperature of 60° C. or more that is higher than the room temperature; and a charging/discharging process of charging and discharging the secondary battery at a second temperature of 60° C. or less that is lower than the first temperature, after the high-temperature aging process.

The hot melt may be in a hardened state during the room-temperature aging process, the hot melt may be changed in phase to a viscous state in which the hot melt has fluidity and viscosity during the high-temperature aging process, and the hot melt may be again changed in phase to the hardened state at the room temperature.

The organic solvent may include at least one or more of toluene, xylene, and methyl ethyl ketone.

Advantageous Effects

According to the present invention, the gasket may adhere to the can member and the top cap assembly to improve the sealing property.

According to the present invention, the coupling agent may be contained in the hot melt applied to the gasket to improve the adhesive property and enhance the waterproof property.

According to the present invention, the hot melt may be applied to the gasket to increase the chemical resistance.

MODE FOR CARRYING OUT THE INVENTION

Figure 1:
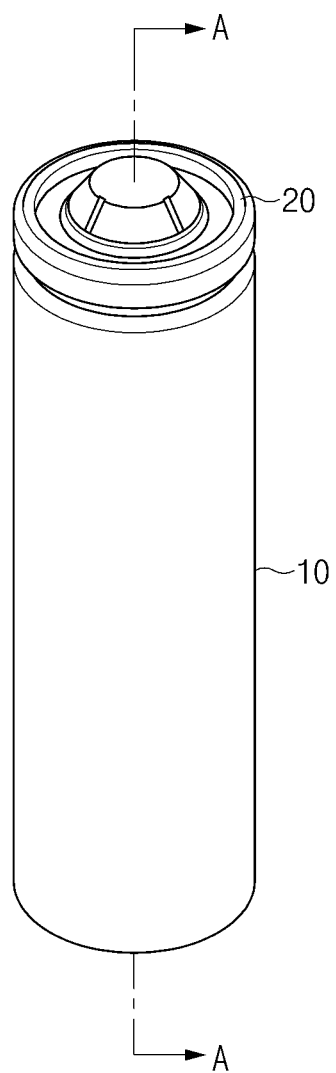
FIG. 1 is a perspective view of a secondary battery according to an embodiment of the present invention.

Hereinafter, a secondary battery and a method for manufacturing the same according to exemplary embodiments of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
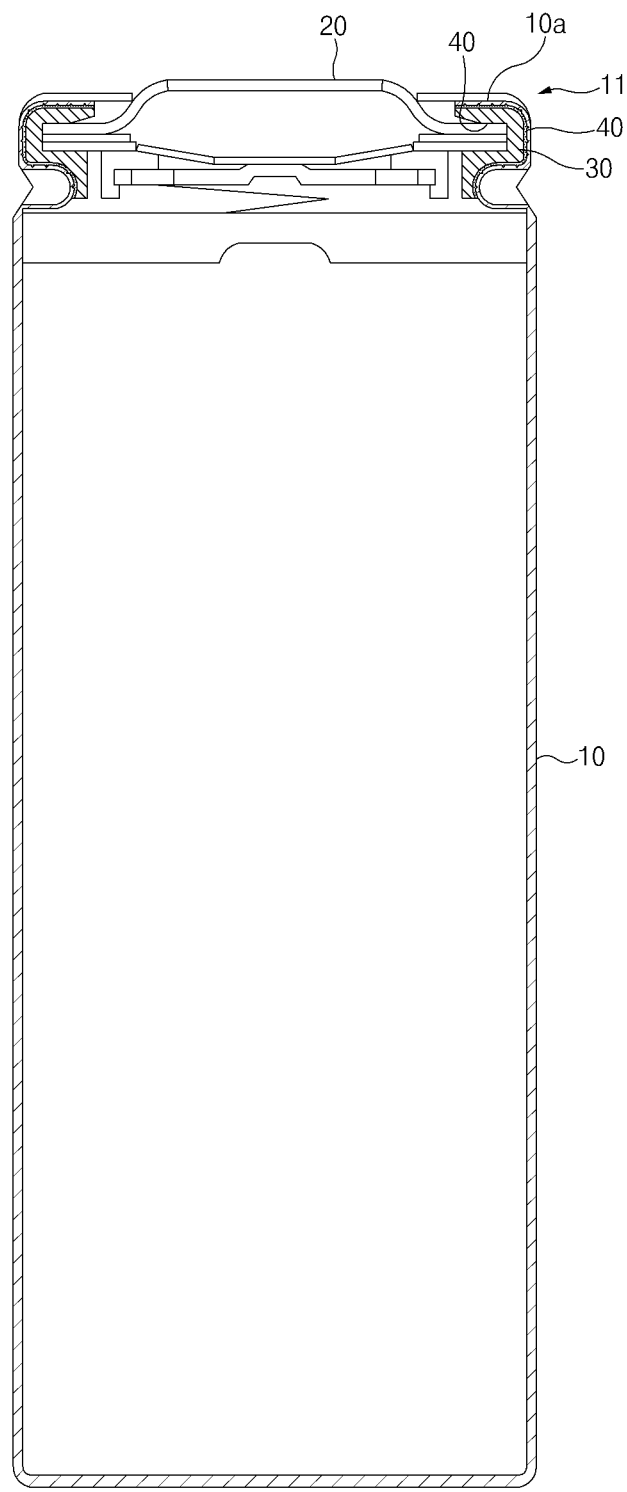
FIG. 2 is a cross-sectional view taken along line A-A of FIG. 1.

FIG. 1 is a perspective view of a secondary battery according to an embodiment of the present invention, and FIG. 2 is a cross-sectional view taken along line A-A of FIG. 1.

Referring to FIGS. 1 to 2, a secondary battery according to an embodiment of the present invention includes a can member 10, in which an opening 11 is defined, a top cap assembly 20 sealing the opening 11, a gasket 30 insulating the opening 11 and the top cap assembly 20 from each other, and a hot melt 40 applied to a surface of the gasket 30.

The can member 10 may be a container made of a metal material and having a shape that is opened substantially upward in a cylindrical or prismatic type lithium ion secondary battery. The can member 10 may be made of aluminum (Al) or steel plated with nickel (Ni) which is light and easy to cope with corrosion.

Also, the can member 10 serves as a container for an electrode assembly and an electrolyte. After the electrode assembly is inserted into the can member 10 through the opened upper end of the can member 10, i.e., the opening 11 defined in the upper end of the can member 10, the opening 11 defined in the upper end of the can member 10 is sealed by the top cap assembly 20.

The gasket 30 is made of an insulation material. An inner circumference of the gasket 30 is closely attached to the top cap assembly 20 to insulate the can member 10 and the top cap assembly 20 from each other, and an outer circumference of the gasket 30 is closely attached to the opening 11 of the can member 10.

Also, the can member 10 further include a crimping part 10a for bending an opening-side circumference that is the upper end of the can member 10 to fix the top cap assembly 20 sealing the opening 11 of the can member 10.

Here, the gasket 30 may be installed between the opening 11 of the can member 10 and the top cap assembly 20 so as to be pressed and fixed to the can member 10 together with the top cap assembly 20 by using a crimping part 10a.

The hot melt 40 is applied to the surface of the gasket 30. Here, the hot melt 40 may be selectively applied to the entire surface or a portion of the surface of the gasket 30.

The hot melt 40 may be made of a combination of a thermoplastic resin and a tackifier and may further contain a coupling agent to improve adhesive property and enhance a waterproof property.

The thermoplastic resin may include a polyester-based resin.

The tackifier may be at least one or more of a phenol-based resin, a carbon-based resin, a rosin-based resin and the like and have a property having viscosity or adhesion.

The coupling agent may be at least one or more of aminosilane, vinylsilane, and the like, which are silicon-based materials, and be a material capable of being bound to oxide of a metal surface. The oxide binding on the inner surface of the metal can member 10 may significantly improve the adhesive property and sealability.

The hot melt 40 may have a property of having fluidity and viscosity while being melted at a glass transition temperature Tg of 60° C. or more.

The hot melt 40 may be maintained in a hard state at room temperature and have the adhesive property while being melted at the glass transition temperature that is a predetermined temperature.

Also, the hot melt 40 may have a material property that is capable of repeatedly having the state of having a viscosity at the glass transition temperature or more and the hard state below the glass transition temperature according to the temperature increases and decreases.

Figure 3:
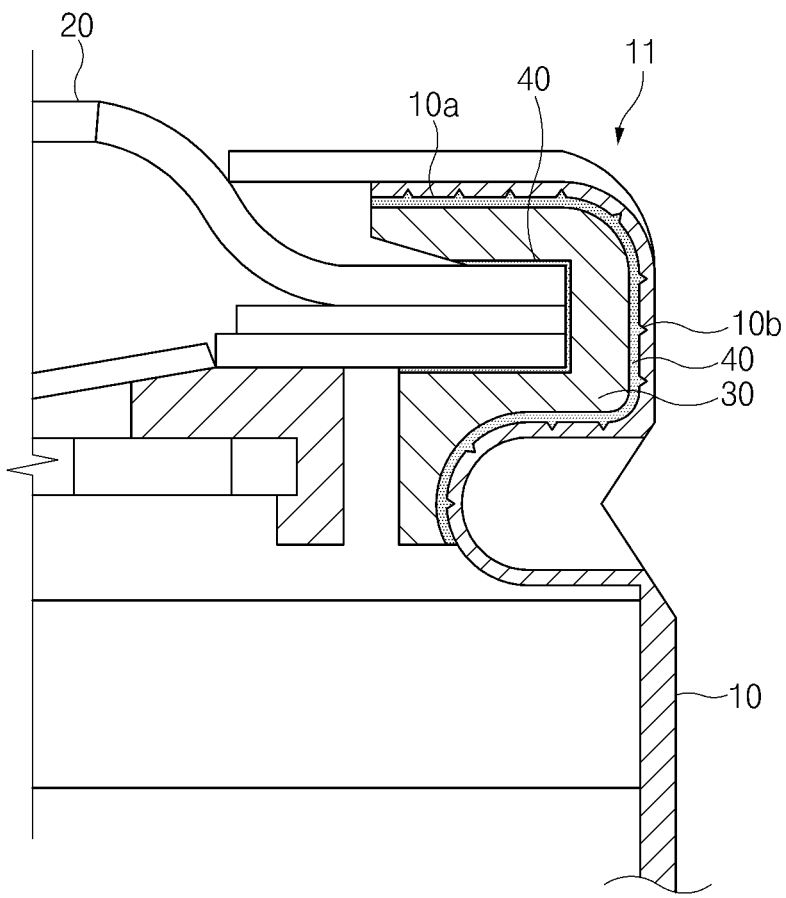
FIG. 3 is a partial enlarged view illustrating a main part of allowing a gasket to adhere to a top cap assembly and a can member in FIG. 2.

FIG. 3 is a partial enlarged view illustrating a main part of allowing a gasket to adhere to a top cap assembly and a can member in FIG. 2.

Referring to FIG. 3, when the hot melt 40 has the adhesive property, the inner circumference of the gasket 30 may adhere to the top cap assembly 20, and the outer circumference of the gasket 30 may adhere to the can member 10.

The principle of the adhesion of the gasket 30 through the hot melt 40 will be described as follows.

The hot melt 40 may be applied to the surface of the gasket 30 at room temperature. Since the hot melt 40 does not have the fluidity and viscosity at room temperature, the hot melt 40 may be only applied to the surface of the gasket 30 and thus may not significantly affect the adhesion of the gasket 30. The gasket 30 may be assembled and installed between the can member 10 and the top cap assembly 20 in the state in which the hard hot melt 40 is applied to the gasket 30. After being assembled, the gasket 30 may be put into an activation process in a state of being pressed.

After the gasket 30 is put into the activation process, the temperature increases at a temperature of 60° C. or more that is the glass transition temperature and then decreases again at room temperature. In this process, the adhesion between the gasket 30 and the can member 10 may be completed.

Particularly, when the temperature reaches 60° C. or more in the state in which the gasket 30 is pressed, a predetermined temperature and pressure may be applied to the hot melt 40 at the same time to allow the hot melt 40 to have the fluidity so that the hot melt 40 is permeated and filled into a fine gap between the coupled surfaces. The gap may be a fine gap formed between the coupled portions or may be a fine gap 10b, a groove, a scratch, an unevenness, or the like, which is formed in the coupled surface of the opening 10 of the can member. In this case, since the hot melt 40 has the viscosity, the hot melt 40 may serve as a sticky medium between the gasket 30 and the top cap assembly 20 or between the gasket 30 and the can member 10.

Thereafter, when the temperature decreases below 60° C. that is the glass transition temperature, the hot melt 40 may be hardened again. The hot melt 40 may be permeated into the gap between the coupled surfaces and then hardened. Thus, in this case, the gasket 30 and the top cap assembly 20 or the gasket 30 and the can member 10 may be very airtightly and strongly coupled to each other by the hot melt 40.

If a coupling agent is further contained in the hot melt 40, oxide coupling may be additionally achieved to obtain additional effects such as improvement in adhesion and enhancement in waterproof property.

Hereinafter, a method of manufacturing a secondary battery according an embodiment of the present invention will be described in detail with reference to the accompanying drawings.

Figure 4:
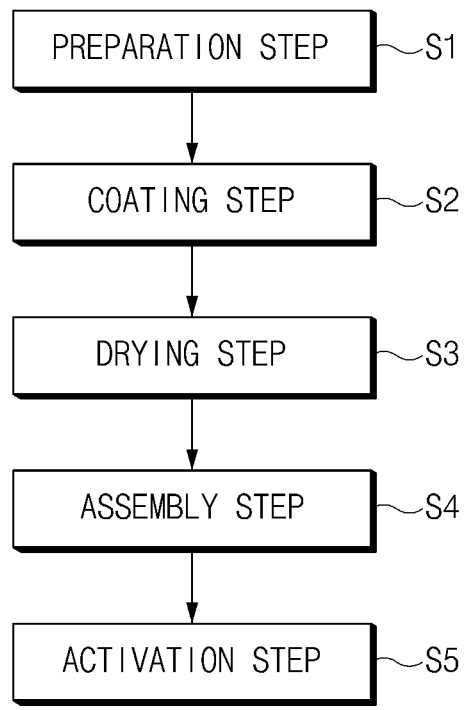
FIG. 4 is a flowchart illustrating a method for manufacturing a secondary battery according to an embodiment of the prevent invention.

FIG. 4 is a flowchart illustrating a method for manufacturing a secondary battery according to an embodiment of the prevent invention.

As illustrated in FIG. 4, a method for manufacturing a secondary battery according to an embodiment of the present invention includes a preparation step (S1), a coating step (S2), a drying step (S3), an assembly step (S4), and an activation step (S5).

The preparation step (S1) may be a step of preparing a can member 10, a top cap assembly 20, and a gasket 30.

The coating step (S2) may be a step of applying a hot melt 40 to a surface of the gasket 30. Here, the hot melt 40 may be melted by using an organic solvent made of at least one or more of toluene, xylene, methyl ethyl ketone, and the like so that the hard hot melt 40 is applied to a surface of the gasket 30 at room temperature. The melted solution may be applied to the surface of the gasket 30.

The drying step (S3) may be a step of drying the gasket 30 to evaporate the organic solvent after the coating step (S2). After the organic solvent is evaporated, only the hot melt 40 may remain on the surface of the gasket 30 to form a coating layer of the hot melt 40 on the surface of the gasket 30.

The assembly step (S4) may be a step of assembling a top cap assembly 20 and the gasket 30 with a can member 10 in which an electrode assembly and an electrolyte are accommodated after the drying step (S3) to manufacture a secondary battery.

The activation step (S5) may be a step of activating the manufactured secondary battery.

Here, the activation step (S5) may include a room-temperature aging process of aging the secondary battery at room temperature, a high-temperature aging process of aging the secondary battery under a temperature environment 60° C. or more that is higher than that of the room-temperature aging process, and a charging/discharging process of charging and discharging the secondary battery under a temperature environment of 60° C. or less that is lower than that of the high-temperature aging process after the high-temperature aging process.

The hot melt 40 may be in the hard state during the room-temperature aging process and be changed in phase to a material having fluidity and viscosity during the high-temperature aging process and then be hardened again during the charging/discharging process and at room temperature.

In this process, the adhesion between the gasket and the can member may be completed. The process of completing the adhesion according to the temperature change is the same as described above, and thus, its description will be omitted.

The method for assembling the second battery according to an embodiment of the present invention may have a great advantage in that the hot melt 40 applied to the gasket 30 strongly adhere to the can member 10 and the top cap assembly 20 while the activation step (S5) of the secondary battery is performed without a separate additional process to improve sealing property. Since the activation step is the existing process, it is unnecessary to separately perform a heating process for the adhesion of the gasket.

As described above, according to the present invention, the gasket may adhere to the can member and the top cap assembly to improve the sealing property.

According to the present invention, the coupling agent may be contained in the hot melt applied to the gasket to improve the adhesive property and enhance the waterproof property.

According to the present invention, the hot melt may be applied to the gasket to completely block the moisture permeation and significantly suppress the corrosion, thereby improving chemical resistance.

Although the secondary battery and the method for manufacturing the same according to the present invention has been described above with reference to the exemplary drawings, various changes and modifications may be made thereto by one skilled in the art without departing from the scope and spirit of the invention as set forth in the appended claims.

The invention claimed is:

1. A method for manufacturing a secondary battery, the method comprising:
   a preparation step of preparing a can member, a top cap assembly, and a gasket;
   a coating step of applying a hot melt that is dissolved in an organic solvent to the gasket;
   a drying step of drying the gasket to evaporate the organic solvent after the coating step;

an assembly step of assembling the can member and the top cap assembly with the gasket after the drying step to manufacture the secondary battery, the hot melt being applied to an entire first surface of the gasket coupling to the can member and an entire second surface of the gasket coupling to the top cap assembly; and an activation step of activating the secondary battery, wherein the activation step comprises changing a phase of the hot melt by changing a temperature of the secondary battery, such that the gasket is airtightly adhered to the can member and the top cap assembly by the hot melt that is changed in phase, wherein during the activation step, the hot melt transitions between a softened viscous state at a first temperature equal to or greater than a predetermined temperature and a hardened state at a second temperature less than the predetermined temperature, the predetermined temperature being a glass transition temperature of the hot melt, wherein the hot melt is permeated into a groove extending into the can member, wherein the hot melt comprises a thermoplastic resin, a tackifier, and a coupling agent, the coupling agent being bound to an oxide of the can member via oxide binding on an inner surface of a metal material of the can member, wherein the thermoplastic resin comprises a polyester-based resin, the tackifier comprises at least one or more of a phenol-based resin, a carbon-based resin, and a rosin-based resin, and the coupling agent comprises one or more of aminosilane and vinylsilane, wherein the activation step comprises:

a room-temperature aging process of aging the secondary battery at a room temperature;

a high-temperature aging process of aging the secondary battery at the first temperature that is higher than the room temperature; and a charging/discharging process of charging and discharging the secondary battery at the second temperature that is lower than the first temperature, after the high-temperature aging process, and wherein the hot melt permeates into the groove extending into the can member during the high-temperature aging process without a separate step for melting the hot melt.

2. The method of claim 1, wherein
the predetermined temperature is 60° C.

3. The method of claim 2, wherein the hot melt is in a hardened state during the room-temperature aging process, the hot melt is changed in phase to a viscous state in which the hot melt has fluidity and viscosity during the high-temperature aging process, and the hot melt is again changed in phase to the hardened state at the room temperature.

4. The method of claim 1, wherein the organic solvent comprises at least one or more of toluene, xylene, and methyl ethyl ketone.

* * * * *